Nov. 21, 1939.  H. J. KETTLEBOROUGH  2,181,089
ICE CREAM FREEZER
Filed June 3, 1938  2 Sheets-Sheet 1
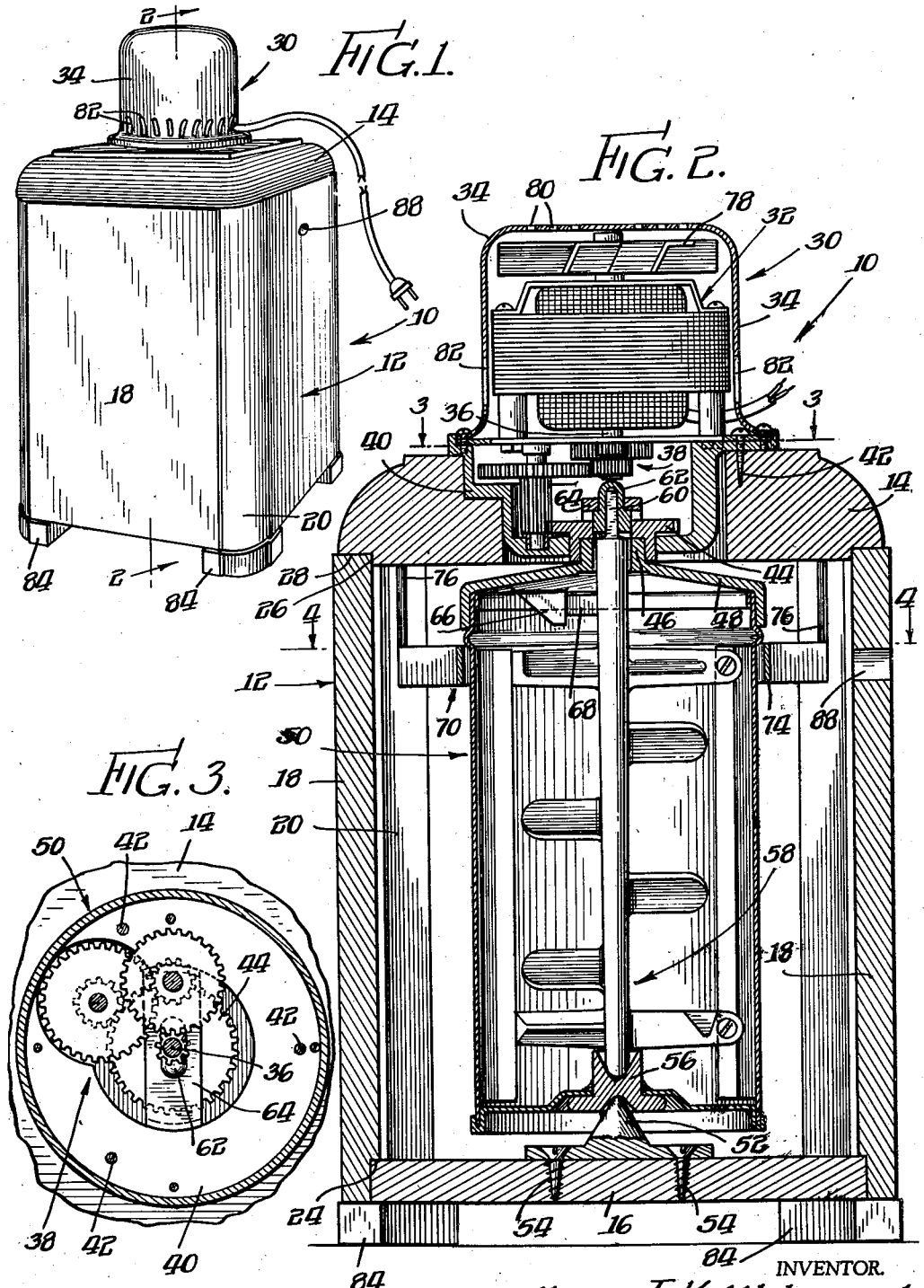
INVENTOR.
Harry J. Kettleborough
BY: Cox & Moore
ATTORNEYS.

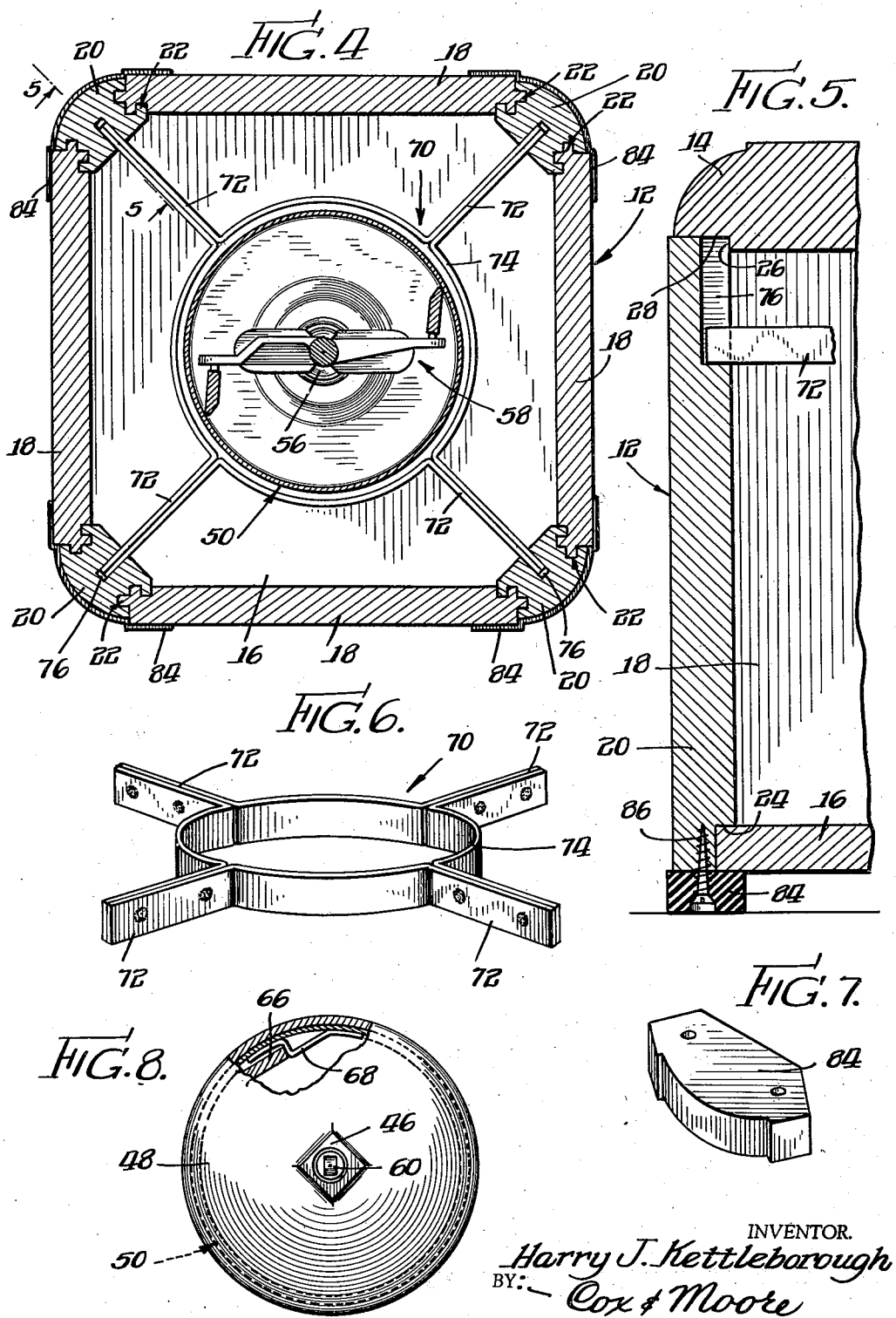

Patented Nov. 21, 1939

2,181,089

UNITED STATES PATENT OFFICE 2,181,089

ICE CREAM FREEZER

Harry J. Kettleborough, Mendota, Ill., assignor to H. D. Conkey & Company, Chicago, Ill., a corporation of Illinois Application June 3, 1938, Serial No. 211,578

4 Claims. (Cl. 259—53)

This invention relates generally to ice cream freezers, and more particularly to ice cream freezers of the electrically propelled type.

One of the oustanding inconveniences experienced in the use of conventional ice cream freezers, both of the manually and electrically propelled variety, is the necessity of continually repackng and salting the ice about the inner container. In conventional freezers the upper portion of the freezer tub is open to the atmosphere, and hence considerable melting of the packed ice takes place before the freezing of the ice cream mix has been completed. Invariably, in the use of conventional freezers, repacking and salting must be made before a single batch of ice cream can be completed. It is therefore one of the primary objects of the present invention to overcome the aforesaid and other disadvantages heretofore experienced, and to this end I propose to provide a freezer of a construction which will reduce to a minimum the contacting of the refrigerant with the atmosphere surrounding the freezer.

More specifically, my invention contemplates a freezer of the type set forth above wherein the cooling medium, such as ice and brine associated therewith, may be completely enclosed during the functioning of the freezer, the top of the freezer tub being completely covered so as to prevent contact with the atmosphere, whereby to materially increase the operating efficiency of the freezer.

The present invention also contemplates a freezer, as set forth above, having a tube of cross-sectional shape which increases the ice capacity and cooperates in preventing circuitous movement thereof when the ice cream mix container is rotated. To this end I provide a tub or container of polygonal cross-section.

In addition to the provision of a cover which completely shields the upper portion of the freezer tub from contacting the atmosphere, my invention also contemplates an electric motor on the cover which may be shifted with the cover as a unit for detachable coupling with the mixing apparatus.

Still more specifically, my invention contemplates an electric motor and cover arrangement, as specified above, wherein the heat developed by the motor is prevented from effecting the operating efficiency of the freezing medium.

The present invention also contemplates a freezer having a number of novel structural improvements, for example, supporting resilient feet, completely sealed joints between the side walls of the tub, and other advantageous structural features.

The foregoing and numerous other objects and advantages will be more apparent from the following detailed description when considered in connection with the accompanying drawings, wherein—

Figure 1 is a perspective view of an ice cream freezer contemplated by the present invention;

Figure 2 is an enlarged central vertical sectional view of the freezer shown in Figure 1, said view being taken substantially along the line 2—2 of Figure 1;

Figure 3 is a detail transverse sectional view taken along the line 3—3 of Figure 2 to more clearly illustrate the manner in which the electric motor is coupled with the mix container;

Figure 4 is a horizontal sectional view of the freezer taken substantially along the line 4—4 of Figure 2;

Figure 5 is a detail vertical sectional view of a corner portion of the freezer tub, said view being taken substantially along the line 5—5 of Figure 4;

Figure 6 is a perspective view of the spider which serves to maintain the ice cream mix container in proper vertical position;

Figure 7 is a perspective view of one of the resilient or rubber feet; and

Figure 8 is a plan view of the mix container and cover therefor detached from the driving mechanism, said cover being broken away to more clearly illustrate the manner in which driving relation is established between the cover and the mix container proper.

Referring now to the drawings wherein like numerals have been employed throughout the various figures, it will be seen that one embodiment of my invention is represented by the ice cream freezer designated generally by the numeral 10, said freezer including a tub 12 and a removable cover portion 14. The tub 12 includes a bottom section 16, four vertical side wall sections 18, and four corner sections 20. Attention is directed to the interlocking tongue and groove joint between each side wall 18 and corner section 20, said joint being designated generally by the numeral 22. Bearing in mind that the tub 12 carries the freezing medium, such as ice and brine, it will be appreciated that a tight, sealed joint at the corners of the tub is essential. The tongue and groove joints 22 prevent a very tight, sealed fit which positively prevents leakage.

The bottom section 16 is also tightly fitted against a shoulder 24 provided along the lower edge of each side wall section 18. It will also be noted that the side walls and corner section cooperate to present a tub of polygonal cross-section, as distinguished from conventional tubs of circular cross-section. This multisided tub provides increased capacity for the freezing medium without adding unsightly and inconvenient bulk to the structure. It will also be understood from the description, which is to follow, that the polygonal arrangement of the tub reduces the tendency for the cooling medium to become agitated as a result of the movement of the freezer parts within the tub.

One of the important improvements in the art of freezer design is the cover section 14. It has been common practice heretofore, both in electrically and manually propelled freezers, to permit contact with the atmosphere of the upper portion of the freezing medium. As previously pointed out, this has materially reduced the operating efficiency of the freezer in requiring the use of additional ice and a longer period of operation to complete the freezing of a batch of ice cream mix. My present invention contemplates complete sealing from the atmosphere of the upper portion of the freezing medium, such as cracked ice, by providing the cover section 14. This cover section 14, in plan, conforms substantially in shape with the transverse cross-sectional shape of the tub 12. The underside of the cover section adjacent the outer margin is preferably recessed so as to provide a shoulder 26, which extends into the tub and cooperates with the cover surface 28 in substantially sealing the inside of the tub from the atmosphere. In practice I prefer to form the cover section 14, as well as the wall and bottom sections of the tub 12 of wood because wood is a good insulator, is reasonable in cost, and particularly lends itself to the fabrication of a multisided freezer construction. Thus, for example, the tongue and groove joints may be readily formed in material such as wood. While I prefer to use material such as wood in the fabrication of my improved freezer construction, it should be understood that the present invention is by no means limited to any one particular material, but contemplates the use of other materials which may be readily fabricated to meet the requirements of the described structure.

For purposes of illustration I have disclosed my invention as embodied in an electrically propelled freezer, the electric motor unit being secured to the cover section 14 and designated generally by the numeral 30 (Figures 1 and 2). This electric motor unit 30 includes an electric motor proper 32 enclosed within a housing or casing 34. The shaft 36 of the motor 32 is coupled with suitable speed reducing gears designated generally by the numeral 38, and these gears are enclosed within a housing 40, said housing being secured to the cover 14 as by means of screws 42, and providing a support for the casing 34. The motor shaft 36 operating through the gear train 38 drives a gear 44, which is rotatably mounted within the lower central portion of the housing 40. This gear 44 is provided with a squared socket on its underside to receive a complementary squared coupling section 46 of a cap 48 (Figure 2), later to be described.

From the foregoing description it will be understood that, when the motor 32 is operated, rotation is imparted to the container cap 48 through the agency of the gear train 38 and the gear 44 which is detachably coupled with the squared coupling section 46 of the cap. The cap 48 forms a cover for a metallic ice cream mix container 50, the bottom of which is centrally supported by and rotatable upon a cone or center section 52. This center section 52 is secured to the tub bottom 16 by screws 54. A bearing member 56 carried by the lower end or bottom of the container 50 is centrally recessed on one side to receive the center 52 and is centrally recessed on the opposite or upper side to receive the lower extremity of an agitator or paddle 58. This paddle 58 is secured against rotation at its upper end by means of a flattened or noncircular portion 60 which extends within a member 62. This member 62 is secured against rotation within a strap 64 which traverses the lower portion of the housing 40 and is secured at opposite extremities to said housing. A tongue 66 formed integral with and depending from the cover 48 is adapted to engage an abutment 68 on the container 50 (Figures 2 and 8) and thus establishes driving connection between the cover or cap 48 and the container 50. It will therefore be apparent that the electric motor 32 serves to impart rotation to the container 50, and that the paddle 58 is secured against rotation within said container.

Disconnection of the drive gear 44 from the complementary driven coupling member 46 and simultaneous disconnection of the upper portion of the paddle 58 from the non-rotatable member 62 may be effected by simply lifting the cover section 14 from the tub 12. Conversely, the coupling or connection of these parts may be readily established by bringing the cover 14 into proper position of alinement with the tub. In this connection attention is directed to a spider designated generally by the numeral 70 (Figures 2, 4, 5, and 6). This spider includes four equally spaced arms 72 which radiate from a common circular section 74. The inner diameter of the section 74 is just large enough to permit convenient passage therethrough of the container 50. The outer or free extremities of the arms 72 extend into companion radial recesses 76 provided in the corner sections 20 of the tub. This spider 70 serves to maintain the container 50 and its associated cover 48 and agitator 58 in a substantially central position when the cover section 14 and its associated electric motor unit have been removed. Thus the spider cooperates in automatically maintaining the central or coaxial disposition of the container within the tub when the freezing medium, such as ice and salt, is packed around the container prior to the association of the cover section 14 with the tub. In other words, the coupling of the drive gear 44 with the squared coupling section 46 and the simultaneous coupling of the upper portion of the paddle 58 with the member 62, when the cover section is brought into association with the tub, are greatly facilitated. The annular section 74 of the spider 70 renders the container 50 and its associated coupling elements self-centered with respect to the tub and cover therefor.

As previously pointed out, the cover section 14 prevents contact with the atmosphere of the freezing medium within the tub 12. The motor unit 30 is so mounted upon the cover 14 as to positively prevent heat developed in the motor coils from being transmitted to the interior of the tub 12. The motor is equipped with a fan 78 which draws air through apertures 80 in the upper portion of the casing or housing 34 and causes air to discharge through apertures 82 disposed along the side wall of the casing 34. In other words, not only is the interior of the freezer completely insulated from the surrounding atmosphere, but also from the heat developed by the electric motor.

At the bottom of the corner portions of the tub 12 I provide resilient or rubber feet 84. These feet are secured to the corner sections 20 by means of a screw 86, as clearly illustrated in Figure 5, each foot being sufficiently countersunk so as to prevent contact of the screw head with the surface upon which the freezer rests. These resilient feet 84 not only prevent defacement of the surface which supports the freezer, but also set up increased frictional surface contact to prevent shifting of the freezer with respect to the floor which might otherwise occur as a result of the rotation of the electric motor and parts coupled therewith. These resilient feet take up the vibrations developed during the rotation of the container 50, thereby reducing to a minimum the noise of operation and the tendency for the freezer to vibrate along the supporting floor surface.

From the foregoing it will be apparent that my invention contemplates a freezer of improved practical construction which enables a batch of ice cream mix to be frozen in much less time than is now required when conventional freezers are employed. I refer particularly to freezers of the type wherein the freezing medium or ice is exposed to the atmosphere at the upper portion of the freezer tub. The present invention contemplates a completely sealed freezing unit, excepting of course a small vent 88 provided in one of the side walls to enable the overflow of liquid. Aside from this small opening, the interior of the tub is completely insulated from the surrounding atmosphere and is also completely insulated from heat developed by the electric motor. Experience in actual operation has shown that, by the use of a freezer constructed in accordance with the teachings of the present invention, the freezing of ice cream can be produced in approximately one-half the time that has heretofore been required in the use of conventional freezers. As previously pointed out, the multisided or polygonal cross-sectional shape of the freezer tub, the self-centering arrangement of the container which carries the ice cream mix, the improved coupling arrangement in combination with the complete cover section for the tub, and the resilient feet all coact to present a very efficiently operable device of extremely simple, durable, and practical construction. The tongue and groove couplings or joints of the wall sections completely seal the refrigerant receptacle or tub against leakage, and preclude the necessity of using any auxiliary fastening devices such as screws, nails, and the like. This arrangement is of particular advantage when wood is used in the construction of the receptacle. In fact, the refrigerant receptacle or tub is substantially free from any such auxiliary fastening devices. The only place where nails or screws need be employed is in fastening the bottom 16 to the lower edges of the side wall structure.

While for purposes of illustration one embodiment of the invention has been disclosed herein, it will be apparent that the invention is not specifically limited to the disclosed structure, but contemplates other modifications and changes coming within the scope of the appended claims.

I claim:

1. In an ice cream freezer, a refrigerant receptacle including bottom and side walls, an ice cream mix container within said receptacle, a removable closure for the top of said receptacle for insulating the interior of the receptacle from the surrounding atmosphere, means in the receptacle for supporting said container centrally with respect to the receptacle while permitting free rotation of the container within said means, said last-named means comprising an embracing bearing portion in which the upper portion of the receptacle is journaled for rotation, a motor carried by the closure, coupling means connected with said motor drive shaft and adapted for detachable automatic coupling with respect to the container when the closure is disposed in operative position upon the receptacle, said supporting means having outwardly projecting portions fixedly engaging the receptacle for fixedly locating the bearing portion within said receptacle and for maintaining the container in operative position for engagement by said coupling means while permitting free rotation of the container for freezing ice cream mixed therein.

2. In an ice cream freezer, a refrigerant receptacle including bottom and side walls, an ice cream mix container within the receptacle, a removable closure on the top of said receptacle and adapted to insulate the interior of the receptacle from the surrounding atmosphere, spider means supported interiorly of the side wall structure of said refrigerant receptacle and having a portion located centrally of the container and embracing the container in bearing relationship while centrally locating and supporting said container, and outwardly-extending, spaced arms on said spider engaging the receptacle for fixedly mounting said bearing portion while permitting access to the intermediate space between receptacle and container, a bearing in the bottom of the receptacle supporting the container for rotation in said spider, a rotary driving means carried by the closure and having detachable, automatic coupling means engageable with the container when the closure is disposed in operative position upon the receptacle, said spider means maintaining the container in operative position for engagement by the coupling means at all times while permitting free rotation of the container by the rotary driving means for freezing ice cream mixed therein.

3. In an ice cream freezer, a refrigerant receptacle including bottom and side walls, an ice cream mix container within said receptacle, a removable closure for the top of said receptacle for insulating the interior of the receptacle from the surrounding atmosphere, means including a bearing member circumferentially embracing the receptacle at a point spaced from the bottom of the receptacle for permitting rotation of the container therein, said member being positioned in said refrigerant receptacle for maintaining the container in upright, operative position therein when the cover is removed, while permitting access to the refrigerant space, and a drive motor carried by the closure and adapted for detachable automatic coupling with respect to the container when the closure is placed in operative position for rotatably driving said container, said bearing member maintaining the container in operative position for engagement by said coupling means and permitting free rotation of the container by the drive motor for freezing an ice cream mix therein.

4. In an ice cream freezer, a polygonal refrigerant receptacle including bottom and side walls, an ice cream mix container within said receptacle, a polygonal removable cover for said receptacle for insulating the interior of the receptacle from the surrounding atmosphere and engageable with said polygonal receptacle against relative rotation, bearing means in the upper portion of the receptacle for supporting said container centrally with respect to the receptacle while permitting rotation of the container within said means, spaced members fixedly supporting the bearing means centrally within the receptacle, and an electric drive motor carried by the cover and adapted for detachable automatic coupling with respect to the container when the cover is placed in operative position for rotatably driving said container, said supporting means maintaining the container in operative position for engagement by said coupling means and permitting free rotation of the container by the electric drive motor for freezing an ice cream mix therein.

HARRY J. KETTLEBOROUGH.

CERTIFICATE OF CORRECTION.

Patent No. 2,181,089. November 21, 1939.

HARRY J. KETTLEBOROUGH.

It is hereby certified that error appears in the printed specification of the above numbered patent requiring correction as follows: Page 1, first column, line 34, for the word "tube" read tub; and second column, line 52, for "prevent" read present; page 2, first column, line 2, for "section" read sections; and that the said Letters Patent should be read with this correction therein that the same may conform to the record of the case in the Patent Office.

Signed and sealed this 2nd day of January, A. D. 1940.

(Seal)

Henry Van Arsdale,
Acting Commissioner of Patents.